Nov. 3, 1942.                B. BRANCH                 2,300,610
                            BARKING DRUM
                         Filed Nov. 17, 1941
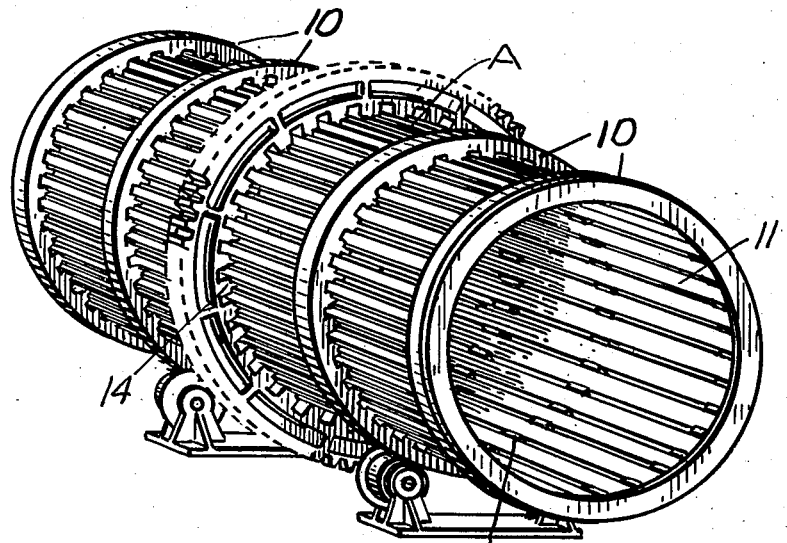
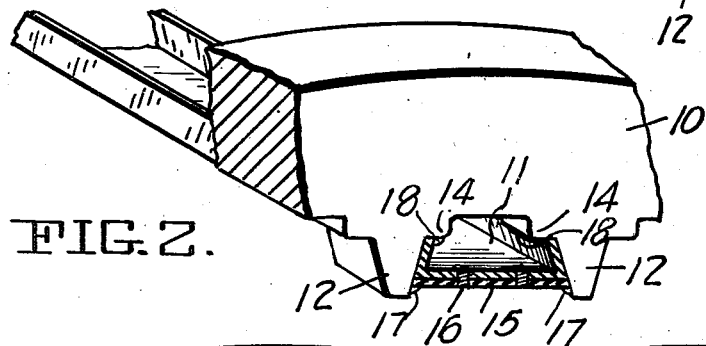
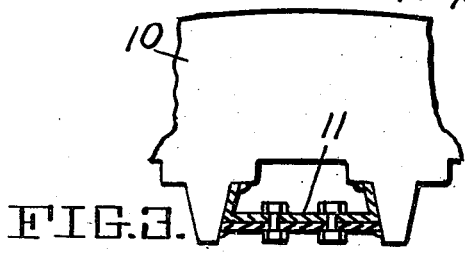 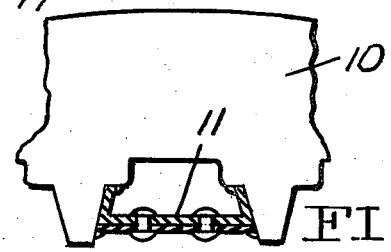
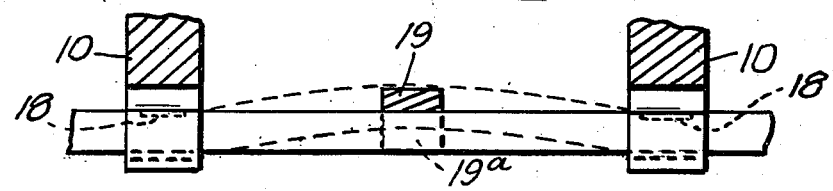
INVENTOR
B BRANCH
BY Eugene E. Stevens
ATTORNEY Patented Nov. 3, 1942

2,300,610

UNITED STATES PATENT OFFICE 2,300,610

BARKING DRUM

Burl Branch, North Bay, Ontario, Canada

Application November 17, 1941, Serial No. 419,483

10 Claims. (Cl. 144—208).

This invention relates to improvements in barking drums of the type employing a plurality of peripherally arranged spaced apart barking members supported by a series of rings.

In this type of structure it has been usual to form the rings with radially inwardly projecting lugs and to connect channel members to said lugs, and each pair of corresponding lugs in adjacent rings, by bolting said channel members to the lugs. This form of construction, however, has several disadvantages. On the one hand, these sections of the channel members between each pair of rings tend to flex outwardly under the force to which they are subjected during operation of the drum and in doing so they finally tend to cause wear between the bolt and bolt hole in the flange of the channels so that an increased flexing action takes place in course of time. On the other hand, the use of a series of bolts for securing the channels and lugs is somewhat costly as special high test bolts must be employed and it is necessary to drill the lugs after the channels have been clamped in place so as to form the bolt holes through both the lugs and channels while it is also necessary to ream the bolt holes.

It is an object of the present invention to provide a special construction for securing the channel members to the rings by welding which will avoid the disadvantage of wear present in prior constructions.

A further object of the invention is to produce a construction of this type which will be more economical to assemble and which may be assembled faster.

A still further object of the invention is to produce a structure which will be more durable than prior constructions.

With these and other objects in view the invention generally comprises the use of a series of spaced apart peripheral rings and interconnecting channel members wherein the lugs are made slightly longer than necessary to accommodate the width of the channel flanges and a facing plate of a length substantially corresponding to the width of the ring is applied at the top of the base of the channel and between the projecting ends of the lugs, such plate being secured to the channel and welded to the lugs themselves, to function as a stiffener and reinforcement for the channel and act as a buffer plate in the welding operation to avoid deterioration of the metal of the channel. The flanges of the channel are also welded in a given area all of which will be understood by reference to the following detailed specification taken in conjunction with the accompanying drawing.

In the drawing:

Fig. 1 is a fragmentary perspective view of a barking drum according to the present invention.

Fig. 2 is an enlarged perspective detail of the connection between the channel members and projecting lugs of the peripheral rings.

Fig. 3 is a fragmentary sectional detail of an alternative manner of securing a facing plate to a channel member.

Fig. 4 is a still further alternative to Fig. 3, and

Fig. 5 is a fragmentary side elevation of one of the channel members disposed to adjacent rings illustrating the use of an anti-flexing band or ring and the ordinary tendency of the channel member to flex during operation.

Referring to the drawing, A indicates a barking drum of known general construction which includes a plurality of peripheral rings 10 spaced apart from one another and a plurality of channel members or bars 11 interconnected with the rings to form a framework. This framework is designed to receive therewithin pulp logs or the like to be debarked and is rotated by usual means. According to the present invention the rings are provided with radially inwardly projecting lugs 12 of conventional type projecting from a base portion 13, the lugs 12 being slightly longer than the conventional lugs previously employed, for a purpose which will hereinafter appear.

The channel members 11 are disposed between pairs of lugs of each ring, the rings being disposed so that their lugs are axially aligned with those of each adjacent ring, the channel members being preliminarily clamped between the lugs for connection therewith as is the usual practice. These channel members are disposed so that their flanges are directed towards the rings and abut shoulders 14 extending between the lugs and their base 13. Over the inwardly disposed surface of the channel members 11 in the area which extends between the lugs of each ring I apply a facing plate 15. These plates are clamped in position between the lugs with the channel member to which they are applied and are secured to the channel member preferably by means of plug welding 16, as shown in Fig. 2. However, they may be secured to their channel members by means of bolting or riveting such as shown in Figs. 3 and 4.

The plates 15 are then directly welded as indicated at 17 to the lugs 12, the longer type of lug employed in this construction, projecting beyond the inner face of the channel members 11 and the facing plates 15 so that a welded connection between the plate 15 and the side walls of the lugs may be attained. However, it is possible, of course, to secure the plates 15 by means of a seam weld to the outer edge of the lugs in the case where the lugs might be of a length so that their ends were flush with the inwardly directed surface of the plate 15.

The plate 15 has more than one function. On the one hand through its connection with the channel member it stiffens and reinforces the latter. On the other hand, it acts substantially as a buffer plate in the welding operation so that any tendency towards crystallization of the metal during the welding operation is taken by the plate 15 and the channel is not affected. This provides a strong and rigid connection between the channels and the lugs of each ring which will not tend to give as is the case where bolts or rivets are used for connecting the channels with the lugs. On the other hand, due to the fact that the channels are not connected directly to the lugs from their inwardly directed surfaces, flexing of the channels between the rings during operation will not have the tendency of fracturing the channels at a point close to the welded connection with the lugs as might be the case if they were welded directly.

To complete the connection between the channels and to form a very durable and substantial connection I weld the edges of the flanges of the channel sections to the lugs, or in effect, to the shoulders 14 as indicated at 18 along a line which extends intermediate the end faces of the lugs but which terminates at a point spaced inwardly from these faces. I preferably terminate these lines of welding 18 at points spaced inwardly from the end faces or end edges of the lugs so that any slight crystallisation or deteriorating effect that the welding may have on the flanges of the channel members at this point will not be present adjacent the end faces or end edges of the lugs at which point the possibility of fracture might otherwise be present due to the fact that these are the points of strain of the channel members during operation.

As a result of this construction I produce a stronger connection between the lugs and the channel members which will not tend to give when sections of the channel members between the rings tend to flex during operation of the drum.

In combination with this means of connection I propose to reduce and substantially eliminate flexing of the sections of the channel members between the rings by adding between each pair of rings an anti-flexing band or ring 19 which is in bearing contact with the channel members and secured to them in any suitable manner. This band is preferably employed although not necessarily essential but will improve the durable character of the drum. With such a band I prefer to employ one having projecting lugs 19a which extend between the channel members and are bolted or otherwise secured thereto.

From the foregoing it will be realized that I have produced a simple, practical means of constructing barking drums so as to produce an extremely durable connection between the channel members and the peripheral rings and which at the same time is more economical to produce in contra-distinction to the prior type of structure requiring the drilling of the channels and lugs, the reaming of the orifices thus produced and the use of special bolts or rivets together with the attendant steps to secure them in position.

What I claim as my invention is:

1. A barking drum including a framework made up of a plurality of spaced apart peripheral rings having radially inwardly extending lugs and a plurality of flanged channel members extending between the rings and fastened to said lugs, said fastening comprising a facing plate substantially corresponding to the width of the channel member applied over each channel member between the lugs and welded thereto, said plate being fastened to the channel member.

2. A barking drum as claimed in claim 1, in which the flanges of the channels are welded to the rings.

3. A barking drum as claimed in claim 1, in which the flanges of the channels are welded to the rings along a line at the free edges of said flanges extending between the side faces of the lugs but terminating at points spaced inwardly of the latter.

4. A barking drum as claimed in claim 1, in which the facing plate is plug welded to the abutting surface of the channel member.

5. A barking drum as claimed in claim 1, in which the facing plate is plug welded to the abutting surface of the channel member, said plate being spaced inwardly from the ends of said lugs and welded to the inner side walls thereof.

6. A barking drum comprising a framework made up of a plurality of spaced apart peripheral rings having radially inwardly projecting lugs and a plurality of flanged channel members extending between the rings and fastened to said lugs, said fastening including a facing plate applied to the inner surface of the channel members at those points where said members extend between the lugs, said plates being fastened to the channel members abutting said inner surface and directly welded to said lugs, and an anti-flexing ring encircling said framework at points intermediate the peripheral rings in bearing contact with said channel members.

7. A barking drum including a framework made up of a plurality of spaced apart peripheral rings having inwardly projecting parts and a plurality of flanged channel members extending between the rings, each fastened to and between inwardly projecting parts of the rings, said fastening comprising a facing plate applied over each channel member and welded at opposed edges of said plate to said inwardly projecting parts, said plate being fastened to the channel member.

8. A barking drum including a framework made up of a plurality of spaced apart peripheral rings having a plurality of receiving means and a plurality of flanged channel members extending between the rings and fastened in said receiving means, said fastening comprising a facing plate applied over each channel member and welded at opposite edges to the receiving means, said plate being fastened to the channel member.

9. A barking drum including a framework made up of a plurality of spaced apart peripheral rings having a plurality of receiving means and a plurality of longitudinal members extending between the rings and fastened in said receiving means to form the framework, said fastening comprising a metal member applied over the inwardly disposed faces of each longitudinal member and welded to the receiving means at opposite edges, said metal member being fastened to the longitudinal member with which it is associated.

10. A barking drum comprising in combination a framework made up of a plurality of spaced apart peripheral rings and a plurality of longitudinal members extending therebetween, said rings being provided with receiving means to receive the longitudinal members the latter being fastened therein, said fastening including a metal member applied over the inwardly disposed faces of each longitudinal member and welded to the receiving means at its side edges, said metal member being fastened to the longitudinal member with which it is associated and anti-flexing means disposed to connect said longitudinal members together at points intermediate the peripheral rings.

BURL BRANCH.